United States Patent [19]

Henderson et al.

[11] 4,240,516
[45] Dec. 23, 1980

[54] VEHICLE SECURING AND LOCKOUT PREVENTION SYSTEM

[75] Inventors: James R. Henderson; Larry E. Lewis, both of Detroit, Mich.

[73] Assignee: Keycon Corporation, Detroit, Mich.

[21] Appl. No.: 4,859

[22] Filed: Jan. 19, 1979

Related U.S. Application Data

[63] Continuation-in-part of Ser. No. 943,578, Sep. 18, 1978, abandoned.

[51] Int. Cl.³ .............................................. B60R 25/04
[52] U.S. Cl. ............................. 180/289; 307/10 AT; 340/63
[58] Field of Search ................... 180/289, 287, 271; 340/64, 63; 307/10 AT

[56] References Cited

U.S. PATENT DOCUMENTS

| 2,189,346 | 2/1940 | Kamp | 180/271 X |
|---|---|---|---|
| 2,295,214 | 9/1942 | Jackson | 340/64 X |
| 2,802,357 | 8/1957 | Smith | 200/44 X |
| 2,843,843 | 7/1958 | Davis | 200/43 X |
| 2,882,987 | 4/1959 | McDougal, Sr. et al. | 180/289 |
| 3,387,259 | 6/1968 | Oliva | 340/64 |
| 3,513,466 | 5/1970 | Isaacs et al. | 340/64 X |
| 3,541,505 | 11/1970 | Lee | 180/287 X |
| 3,544,804 | 12/1970 | Gaumer et al. | 180/287 X |
| 3,550,408 | 12/1970 | Archaux et al. | 307/10 AT X |
| 3,634,880 | 1/1972 | Hawkins | 180/287 X |
| 3,639,772 | 2/1972 | Wilson | 180/287 X |
| 3,641,492 | 2/1972 | Vinokur | 180/287 X |
| 3,649,962 | 3/1972 | Bedard et al. | 340/64 |
| 3,656,102 | 4/1972 | Hale et al. | 340/64 |
| 3,691,396 | 9/1972 | Hinrichs | 34/64 X |
| 3,698,505 | 10/1972 | Webley | 340/63 X |
| 3,710,316 | 1/1973 | Kromer | 340/63 |
| 3,723,967 | 3/1973 | Atkins et al. | 180/289 X |
| 3,735,346 | 5/1973 | Fox | 180/287 X |
| 3,740,713 | 6/1973 | Teich | 340/64 |
| 3,781,789 | 12/1973 | Caleskie et al. | 180/289 X |
| 3,803,551 | 4/1974 | Jordan | 180/287 X |
| 3,815,088 | 6/1974 | Kumpfbeck et al. | 180/289 X |
| 3,824,403 | 7/1974 | McGuirk, Jr. | 340/63 X |
| 3,852,614 | 12/1974 | Carlson | 180/289 X |
| 3,866,168 | 2/1975 | McGuirk, Jr. | 180/289 X |
| 3,876,884 | 4/1975 | Housman et al. | 307/10 AT |
| 3,956,732 | 5/1976 | Teich | 307/10 AT X |
| 3,967,239 | 6/1976 | Steele | 180/287 X |
| 3,986,166 | 10/1976 | Kohn | 180/287 X |
| 4,092,506 | 5/1978 | Saulters | 180/287 X |
| 4,107,543 | 8/1978 | Kaplan | 180/287 X |
| 4,123,745 | 10/1978 | Gurgone | 180/287 X |
| 4,151,508 | 4/1979 | Hensler et al. | 180/287 X |

*Primary Examiner*—John J. Love
*Assistant Examiner*—Milton L. Smith
*Attorney, Agent, or Firm*—Cesari and McKenna

[57] ABSTRACT

A solid state vehicle securing and lockout prevention system for an automobile having power operated accessories such as automatic door lock, power door windows, power roof window, power trunk release, power hood release, power antenna control, and a horn selectively identifies authorized users to enable operation of the ignition, prevents lockout of the operator, and secures the vehicle and its accessories upon departing from the vehicle. A card reader for use with encoded cards is utilized to enable the system. A mechanical switch at the ignition assembly is utilized to detect the presence of the key in the ignition for lockout prevention by reopening any locked door and sounding the horn to alert the operator should the key remain in the ignition inadvertently. The mechanical door switches are utilized to determine whether to activate the vehicle securing controls for the door locks, windows, and sunroof in timed sequences. A disabling device for each of the respective controls for the door lock, roof window, door window, and antenna is also provided for the valet parking attendant. A digital counter is also provided for timing all of the digital control functions of the system and is reset upon each instant the driver door is opened. A timing device to disable the control elements upon a predetermined maximum time period for the purpose of system shut down is also provided.

21 Claims, 14 Drawing Figures

VEHICLE SECURING AND LOCKOUT PREVENTION SYSTEM

BACKGROUND OF THE INVENTION

This is a continuation in part of Ser. No. 943,578 filed Sept. 18, 1978, now abandoned, and all matter therein is incorporated herein by reference.

This invention is related to the art of automatic automobile securing systems and lockout prevention system for motor vehicles having power operated accessories such as power windows, power door locks, power roof window, power antennas, trunk release, hood release, or other accessories. More particularly, this invention is concerned with solid state logic circuitry for performing automatic lockout prevention, and shut down of all vehicle accessories.

The provision of securing systems and lockout prevention means for automobiles is not novel, but however, the algorithim by which they are performed will vary greatly among prior art devices. Heretofore, several systems have been presented. One such device is disclosed in U.S. Pat. No. 3,228,490 issued to Ackman on Jan. 11, 1966 in which an automatic automobile locking device consisting of a series of relays and solenoids which controls door locking and window closing functions is disclosed.

A lockout preventor is also disclosed in U.S. Pat. No. 3,399,554 issued to Hogue on Sept. 3, 1968. Its primary purpose is to provide a lockout preventing system for an automobile which assures that the vehicle doors cannot be unintentionally locked from the outside of the vehicle while the keys are in the ignition. The system consists of an ignition key presence sensor which will activate a solenoid to reopen the door locks should the key be present in the ignition when the door is closed. Present day vehicles are more complex in the sense that a multitude of other accessories are present. The prior art devices are not adaptable to accommodate and secure the extra accessories, nor do they provide the operator the convenience of selective accessory control. Moreover, since there are occasions where automatic shut down is not desired, the prior art devices cannot be disabled at will.

Specifically, the instant invention consists of a number of sensing devices to sense the presence of the key in the ignition, the position of the ignition key, and the status of the vehicle door (open or closed). Upon sensing a combination of these conditions, either the doors are locked or unlocked, depending upon the existence of certain conditions, or the entire vehicle is completely secured by the automatic closing of windows, doors and retraction of an antenna, if present.

The premises considered, it is a primary object of the invention to provide an automatic shut down and lockout prevention system for an automobile having selectively controllable accessories.

It is a further object of the invention to provide a simplistic and economic means to perform the functions as aforestated employing solid state devices.

Other and additional objects of the invention will become more readily apparent upon reading the following detailed description and illustration of drawings.

SUMMARY OF THE INVENTION

Figure 1:
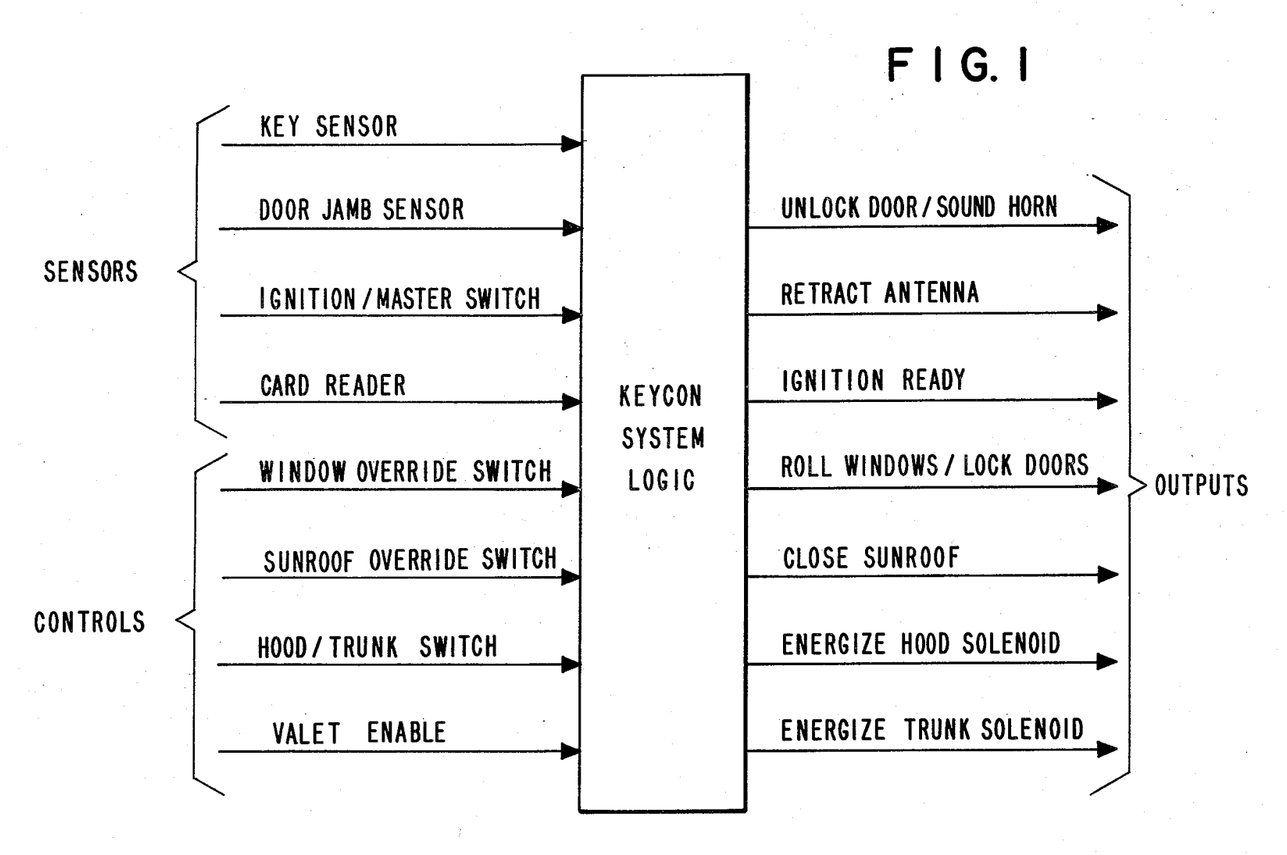
FIG. 1 shows a simplified diagram of inputs, outputs and controls for the logic system of the subject invention.

The invention can be best summarized by reference to FIG. 1 wherein a single block diagram with several groups of inputs, outputs, and controls is shown. The entire system is adapted to act in cooperation with conventional motor vehicles and their accessories, except for the addition of a power operated hood release which is non-standard for most automobiles.

Specific reference to FIG. 1 discloses the preferred embodiment having four input sensors. The first is a key sensor to sense the presence of the key of the ignition, should the vehicle be key operated. In another embodiment of the invention as defined by the appended claims, the system provides for the operation of the vehicle without a key as conventionally known. Access to the vehicle and operation of its accessories is accomplished by the added system controls. A second input to the system is a door jamb sensor for the two front vehicle doors of the automobile. The sensors are electrically connected to the already existing door jamb switches, thus obviating the necessity of additional wiring. A third input to the system is the ignition/master switch which enables the ignition system for internal combustion engines and permits activation of the starter and other accessories. The fourth input to the system is the output of a card reader which selectively detects magnetically encoded cards.

For keyless vehicles, the card reader is disposed outside of the vehicle, preferably near the driver's door for convenient access. A selective code of the card reader may be programmed by resetting the detection circuitry within the card reader circuit.

The system, again in its preferred embodiment, has seven outputs to control the various accessories of the vehicle, such as the horn, door locks, antenna, ignition enable, sunroof, hood, and trunk release. The manner of control of each accessory is predetermined by the logic functions of the system. Each output of the logic circuitry supplies a voltage to relays or solid state devices to automatically operate the respective accessories. Limit switches and timers are provided to sequence and time the operation of the respective controls. Electrical power is tapped from the presently existing vehicle power supply. The logic circuit itself, since it is designed for continuous operation, consumes a minimum amount of energy, e.g., less than 10 milliamperes at 12 volts.

The actual logic circuitry consists of, inter alia, NAND gates, NOR gates, inverters, latches, and single shot multivibrators. In operation, the circuit arrangement provides for the door to be unlocked and/or the horn to blow continuously or intermittently whenever the door is closed while the key is present in the ignition. In the operation of a keyless vehicle, a coded card than providing access and operation, the horn would blow and the door would be automatically unlocked when the card is present in the card reader.

When conditions are met for the automatic securing mode, the antenna is retracted, door windows are closed, roof window is closed, and doors are locked. The conditions which must exist for securing are (1) key removed from the ignition and (2) door opened and closed in sequence. Time delays are provided in the circuit to sequence all operations. After the operation of the securing functions, the entire system is reset so as to be ready to repeat the process at the will of the operator.

The card reader is essentially a master control for the system. It enables, upon insertion of the properly coded identification card, the ignition switch to be activated and/or the starter to be engaged. It also enables trunk release and hood release swiches which are manually operated. A conventional card reader adaptable to read magnetically coded cards is utilized. Again, the system may be designed with the card reader internal or external to the vehicle, depending upon whether key or keyless vehicle operation is desired. Once the trunk release or hood release switch is manually engaged, the operator has a predetermined time period, say 30 seconds to open the hood or trunk, otherwise, the system will automatically disable the trunk or hood release mechanism.

A valet feature is also incorporated into the system wherein, while the key is in the ignition and the valet switch has not been previously engaged, a valet parking operator may, for one occasion only, restart and operate the vehicle without possession of the coded identification card.

Override switches for the sunroof, antenna and door windows are also provided for the convenience of disabling the operation of the windows and antenna under certain circumstances.

Basically, the system is designed to prevent lockout of the operator and to automatically secure the vehicle when the operator and occupants exit by opening and closing doors. The system may also be modified so that an alarm will sound upon unauthorized entry. Logic circuitry may be included to activate a siren, horn, or other device upon the opening of the door, hood, or trunk without a properly coded identification card.

BRIEF DESCRIPTION OF THE INVENTION

Figure 2:
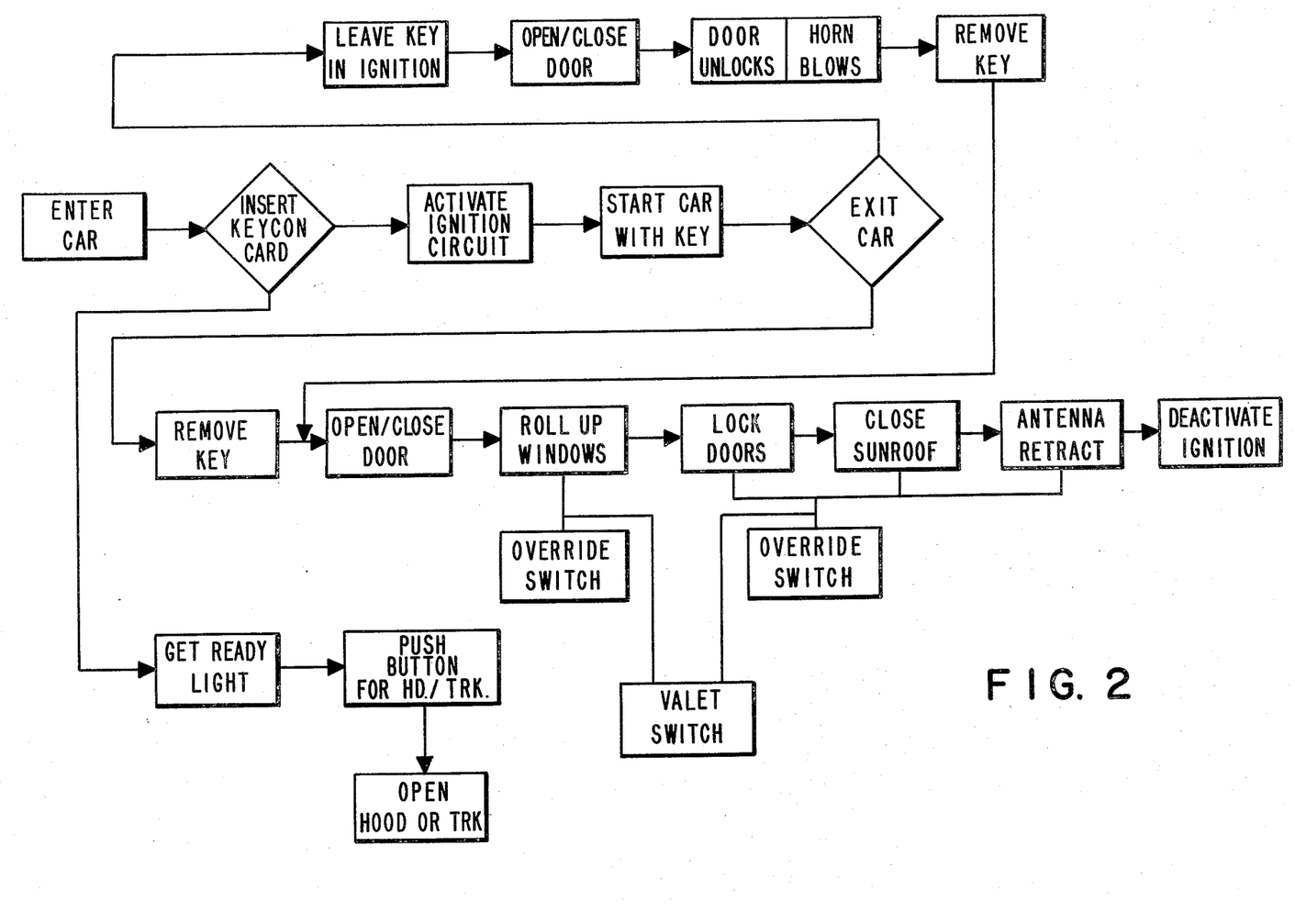
FIG. 2 shows a flow diagram of the sequence of events of the invention.

Referring now to FIG. 2, a flow diagram of the activities and events pertaining to the invention of the subject disclosure is shown. Upon entering the vehicle, a coded card is inserted into a card reader mounted on the instrument panel whereupon the ignition circuit is enabled and the hood and trunk release switches are enabled for a predetermined time period. The operator may choose to open the hood or trunk and/or start the vehicle.

At some time after the vehicle is started, the operator will exit the vehicle whereupon the ignition key will be removed or remain in the ignition. Should the key remain in the ignition and the door is opened and closed, the power operated door locks will automatically unlock and the horn will blow as long as the door remains closed. The process may then be repeated after removal of the key and, upon the closing of the door, the windows will automatically close after a predetermined time period, say 10 seconds, the doors will lock, the sunroof will close, and the antenna will retract, provided however, that the override switches for the windows, sunroof, or antennas have not been depressed. A valet switch is provided to also disable the roof, window, and antenna accessories and to enable a valet parking attendant to restart the vehicle once without inserting the control card. The valet and override switches are operational only upon removal of the key from the ignition.

Figure 4:
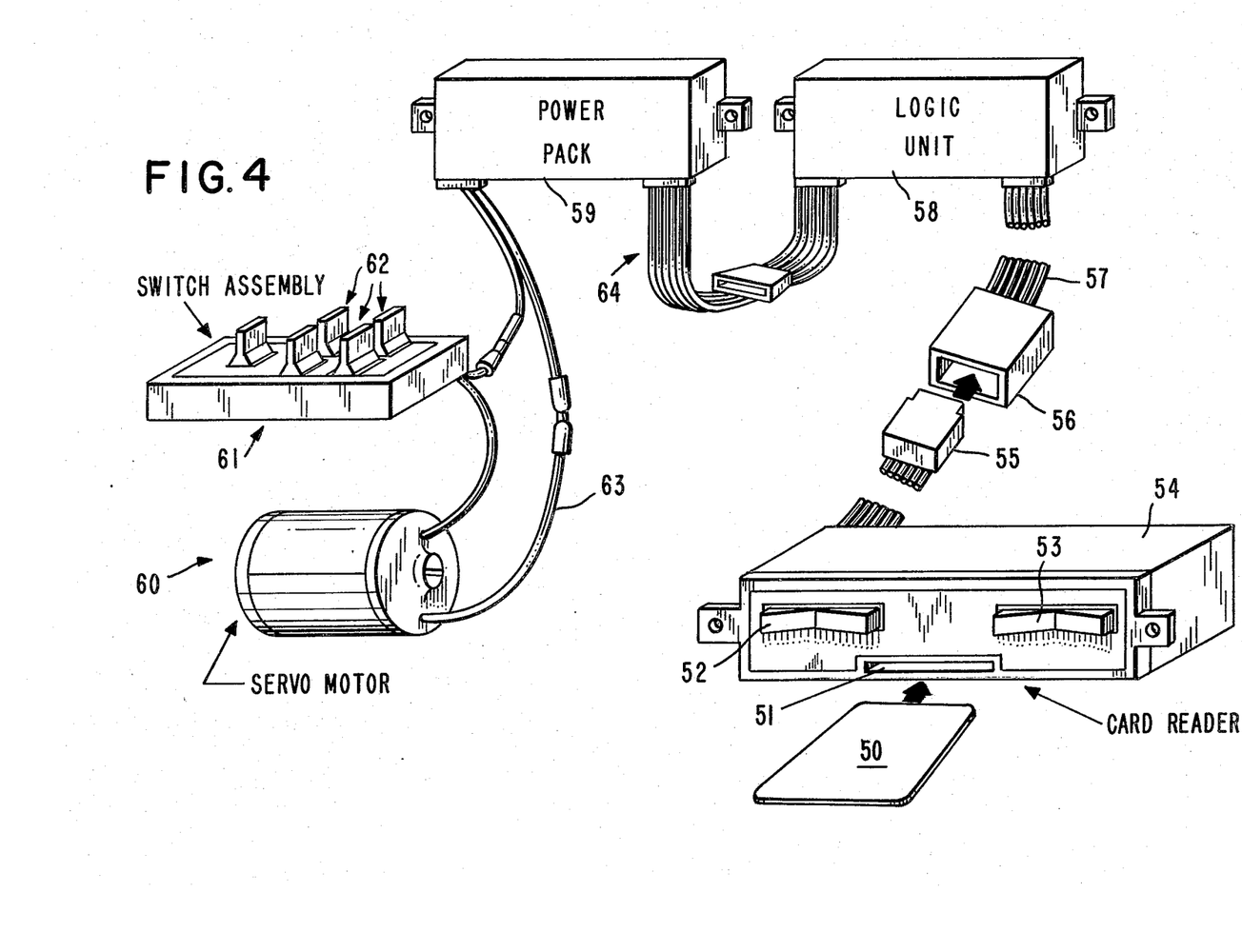
FIG. 4 shows the modular components of the security system of this invention.

FIG. 4 of the system discloses the several parts of the system and the manner in which they are interconnected. The system employs a magnetically encoded card 50 containing selectable and magnetically recorded information thereon that is detected and identified by card reader 54. Once detected and properly identified, an enabling signal is transmitted via cable 57 to logic unit 58 which enables the vehicle ignition and accessories according to an algorithim which will be more fully hereinafter discussed. Power pack 59 contains relays and switches which are connected to various vehicle accessories, such as a servo motor 60 which may operate the windows or antenna or any other vehicle accessory. In the particular embodiment shown in FIG. 4, the servo motor is shown in conjunction with a switch assembly 60 which controls the vehicle windows. The logic unit 58 through power pack 59 provides a means to short circuit or open circuit the various contacts in switch assembly 61 according to the programmed logic. Although only one vehicle accessory is shown in FIG. 4, it is shown only for illustrative purposes, and it should be noted that all vehicle accessories are controlled by the logic unit and power pack.

Switches 52 and 53 of the card reader 54 provide means for disabling the automatic operation of certain selectable vehicle accessories. For instance, if it is desired that the vehicle windows not be controlled by the logic system, switch 52 may be depressed to disable that portion of the logic contained in logic unit 58, so that upon exiting from the vehicle, there will be no automatic operation of such accessory. Switch 52 may also be utilized for any additional accessories which are desired to be disabled.

For convenience in installation and servicing, ribbon cables 57 with quick disconnect and connect means 55 and 56 are utilized throughout the entire system.

Figure 5:
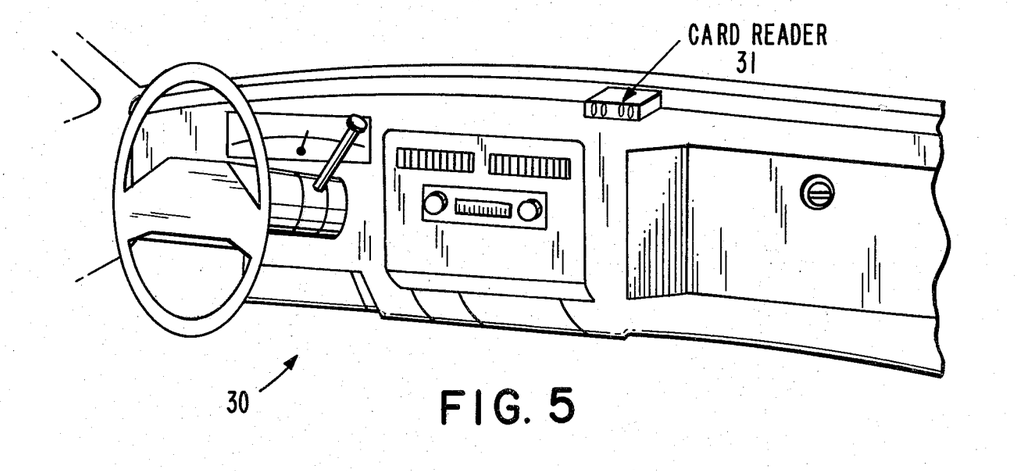
FIG. 5 depicts an automobile instrument panel on which the card reader module of the security system of this invention is mounted.

Now referring to FIG. 5, the preferred location of the card reader device is shown to be disposed on the instrument panel of the vehicle. Once the vehicle is entered by conventional means, with a lock and key, the operator would insert his magnetically encoded card in card reader 31. At this point, the vehicle ignition would be enabled so that the operator may start the car by usual means.

Normally, an ignition key is utilized to operate an ignition assembly on the steering column, but however, as an additional feature of this invention, the ignition assembly may be removed and the starter switch may be employed to start the vehicle, since the ignition is enabled automatically by the electronic control system.

Figures 10, 11:
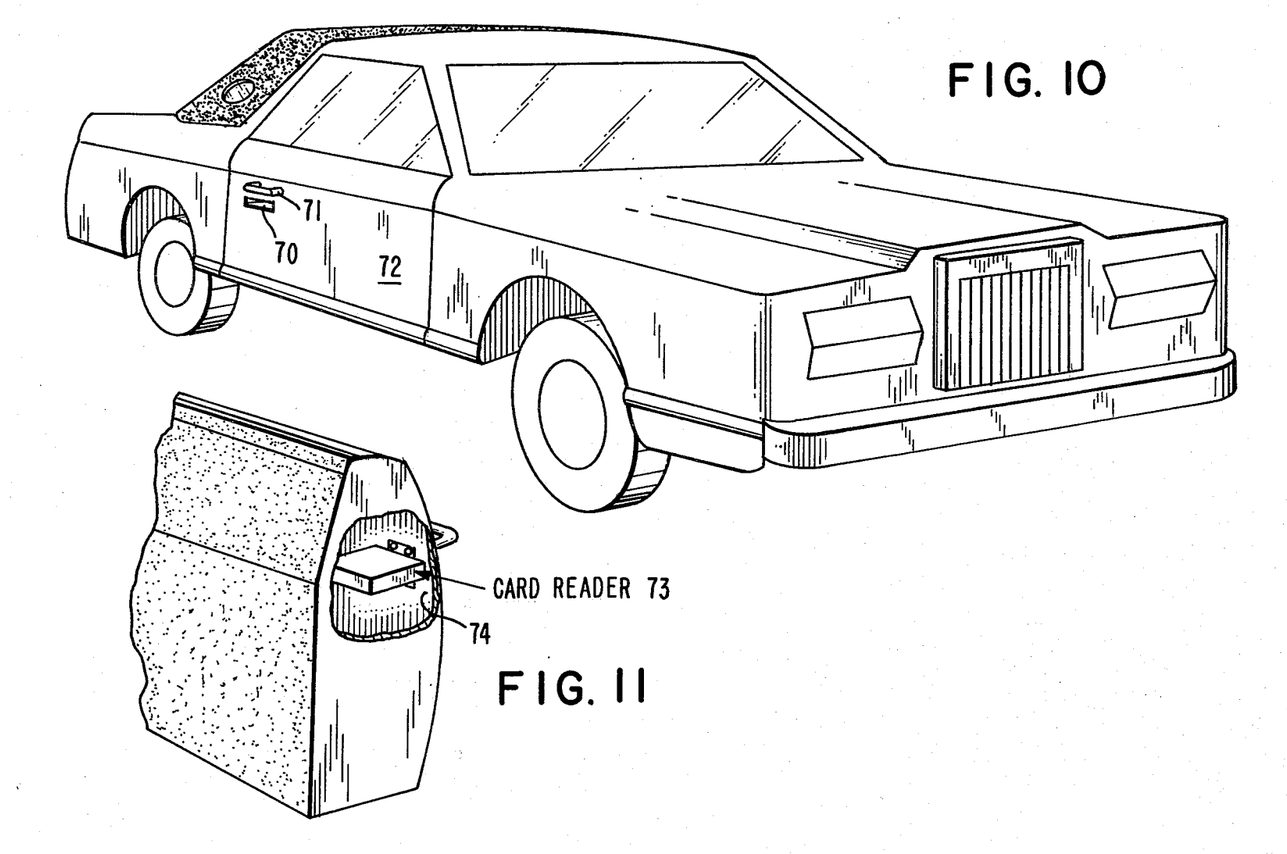
FIGS. 10 and 11 depict the preferred vehicle location of the card reader module for keyless entry version of this invention.

Inasmuch as a key is not necessarily required for a vehicle having the electronic control system, the key may be eliminated altogether whereupon the vehicle may be entered automatically by means disclosed in FIG. 10 and FIG. 11.

FIG. 11 discloses a vehicle door having a card reader near the handle thereof whereby a magnetically encoded card may be inserted into slot 70 of FIG. 10, whereupon the vehicle door lock would automatically open to allow entry. Card reader would be placed inside of the door assembly specifically as shown in FIG. 11 wherein card reader 73 is disposed against the inside wall 74 of the door. The location of the card reader is not necessarily restricted to the door, and may be placed anywhere external of the vehicle so that entry may be effected by the operator.

Figure 6:
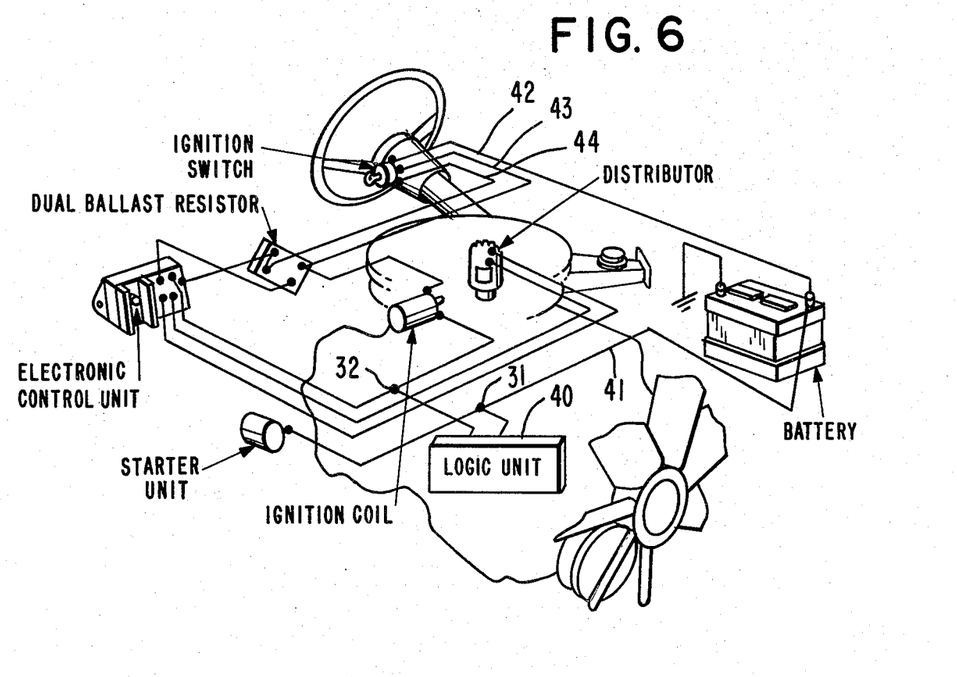
FIG. 6 depicts the electrical interconnections of the security system of this invention to the automobile ignition and starter circuits.

Now referring to FIG. 6, the connections of the logic unit with the ignition and electrical system are disclosed. As shown in the electronic diagram, logic unit 40 is shown to be connected to points 31 and 32 whereby the electrical power to the starter unit from the battery may be interrupted at point 31 and the ignition coil of the system may have its power interrupted at point 32. The logic unit itself is supplied with electrical power from the battery by independent and separate connection means.

The logic unit is shown to interrupt the electrical power of the starter unit and coil, but however, without departing from the spirit and scope of the securing features of the invention, the logic unit may interrupt the electrical system at any point in the electrical circuit. For instance, the electrical connection between the ignition switch by lines 42, 43, and 44, may also be interrupted by the logic unit to disable the ignition and activation of the starter of the vehicle. The electrical power and connections to the distributor, other electrical elements of the ignition system may also be interrupted, so long as the vehicle is disabled.

Figure 7:
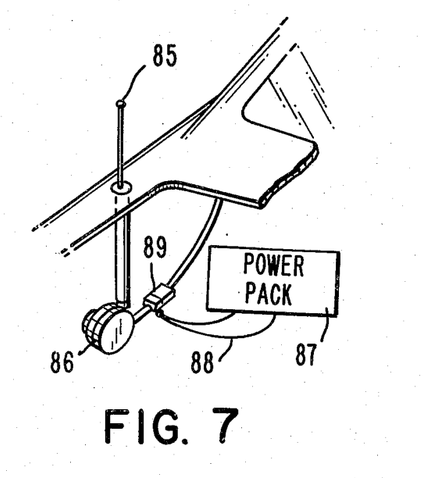
FIG. 7 depicts the electrical interconnections of the security system of this invention to the automobile antenna motor control circuit.
Figure 8:
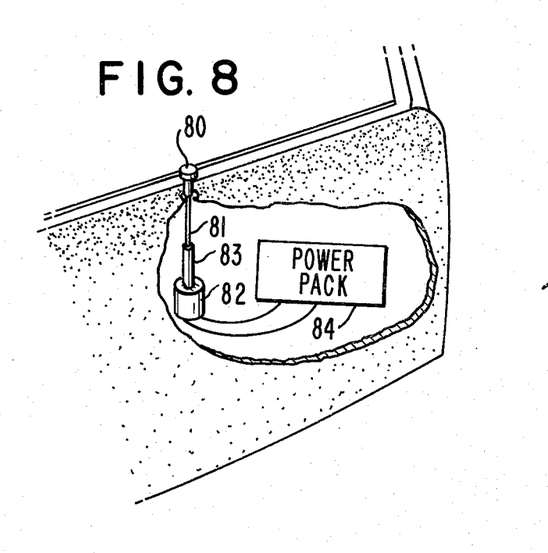
FIG. 8 depicts the electrical interconnections of the security system of this invention to the power operated door locks of a motor vehicle.
Figure 9:
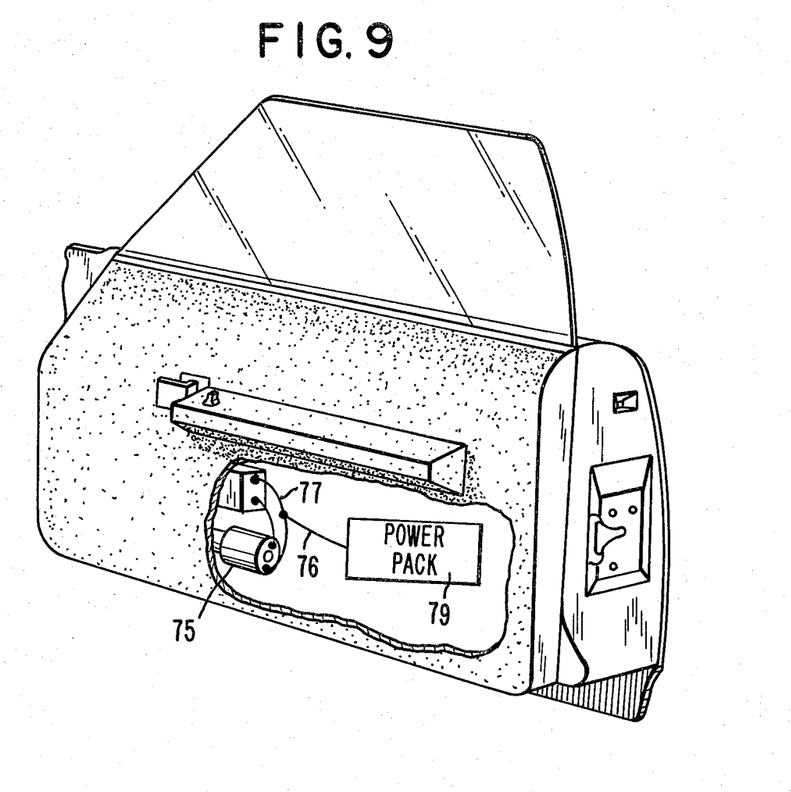
FIG. 9 depicts the electrical interconnections of the security system of this invention to the power operated window motor control circuit of the automobile.

Referring now to FIGS. 7, 8, and 9, the electrical-mechanical interaction between the logic unit to activate or deactivate or control the vehicle accessories is shown. Referring specifically to FIG. 7, the vehicle antenna 85 is shown to be lowered by the supply of electrical power from the power pack 87 along cables 88 to connection 89 to operate the retraction motor 86. The power pack, being controlled by logic unit 58 of FIG. 4, supplies the appropriate power with the appropriate polarity of current in order to retract or extend the antenna as desired.

Now referring to FIG. 9, an electrical servo motor 75 to be activated or deactivated by power pack 79 through cables 76 and 77 in order to operate the vehicle windows is shown. It is the intent to secure or close the vehicle windows upon departing from the vehicle, and accordingly, the logic unit will supply the appropriate commands to power pack 79 in order to accomplish that task. Since several types of servo motors may be employed in the different types of vehicles, the logic unit and power pack will be accommodating to either reverse polarity type motors or single polarity type motors while performing the securing task.

Referring now specifically to FIG. 8, the door lock assembly is shown wherein door lock handle 80 is shown to be operated by solenoids 82 through linkages 81 and 83. As will be more fully hereinafter explained, the vehicle door locks will be opened or closed according to certain predefined conditions detected by the logic unit. The doors and door locks are automatically opened or released when the key or card is left in the ignition or card reader so that the vehicle may be re-entered after the operator departs from the vehicle. When the key is removed, and the operator departs from the vehicle by opening and closing the door, the door locks will automatically lock within a predetermined time period.

Figure 12:
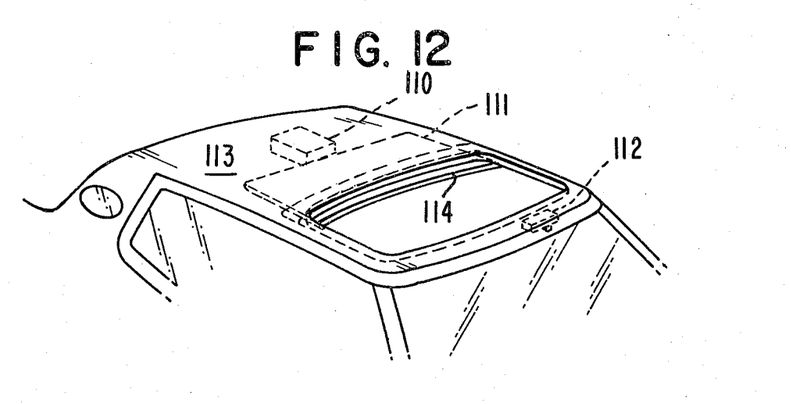
FIG. 12 depicts the location of the control circuit module of the power operated roof of the vehicle.

FIG. 12 shows a vehicle roof having a sunroof which is electrically operable by a sensor motor to open and close according to certain conditions. The window may be manually operated or electrically operated by the logic unit and power pack of the system. Upon departing from the vehicle in a certain manner, the logic unit will send a command to the power pack to automatically move the roof window 114 to a closed condition. The power pack is connected to servo mechanism 110 in order to drive the window within slot 111 to its closed condition. It should be noted that the vehicle accessories, such as the antenna, door lock, door windows, and roof windows, are not novel and that their operation is not intended to be restricted to in any manner by the logic unit disclosed herein. The electronic control system in the logic unit is only supplemental to the operation and the appropriate electrical connections are made at various points within the vehicle to control the vehicle accessories optionally. Those accessories may be selectively controlled or activated by the logic unit according to certain switches contained on the reader as previously discussed with reference to FIG. 4. The logic unit together with the power pack provides only electrical connection to control the solenoids or relays already existing within the vehicle. Wherever a vehicle accessory is not electrically controlled, a relay, servo motor, or solenoids may be added to accommodate the automatic control features of the system.

Figure 13:
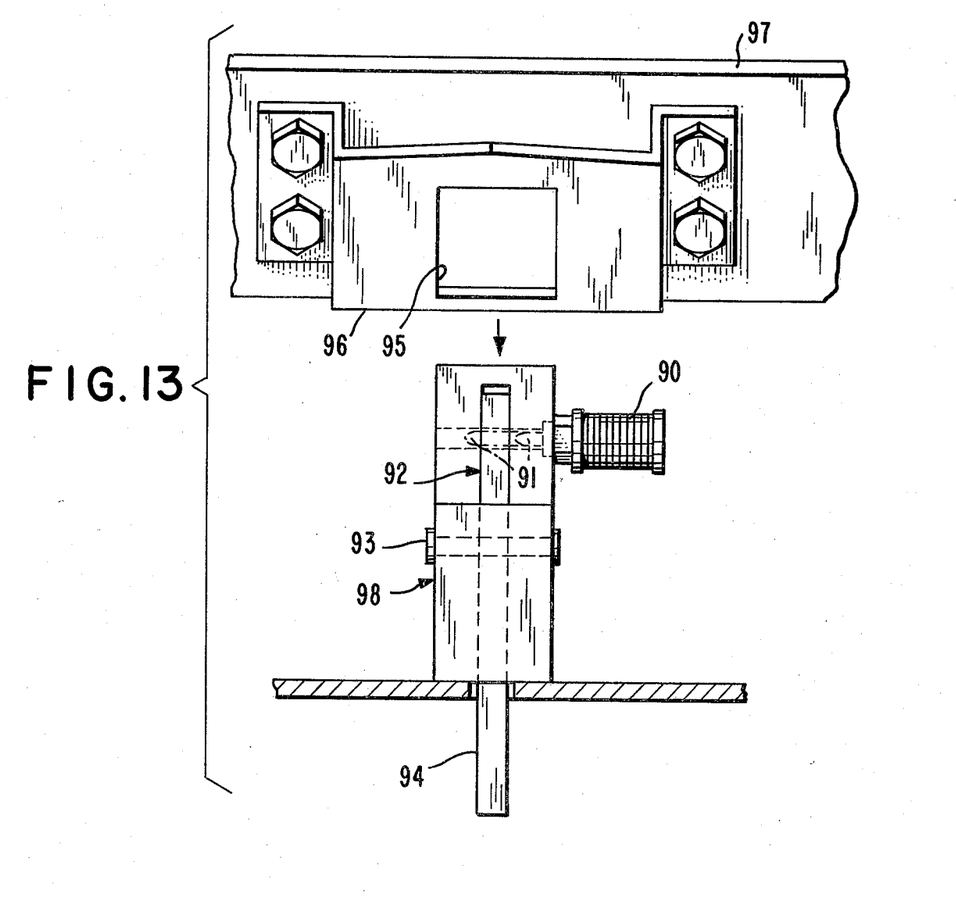
FIG. 13 depicts a preferred inhibiting mechanism for a hood or trunk latch of a motor vehicle.

With respect to FIG. 13 relating to the hood and front latch assembly, a relay or solenoid having a dead bolt latch assembly is added to the vehicle in order to provide additional security means. Specifically, relay 90 is shown having an armature 91 which may be extended or retracted into latch assembly 92 to inhibit arm 90 which pivots upon pin 93 so that the hood or trunk may not be opened when the latch assemblies are mated. In operation, the top portion of the hood or trunk 97 is mated with mating element 98 at the opening 95 of element 96. In a closed position or mating position, pivot arm 94 is swung forward in the diagram to cause a locking relationship between elements 97 and 98. In a locked position, the armature 91 of relay 90 is either opened or closed according to the logic dictated by the electronic control system. In this manner, additional securing or locking features may be implemented on a vehicle to secure both the trunk and hood.

Figure 3:
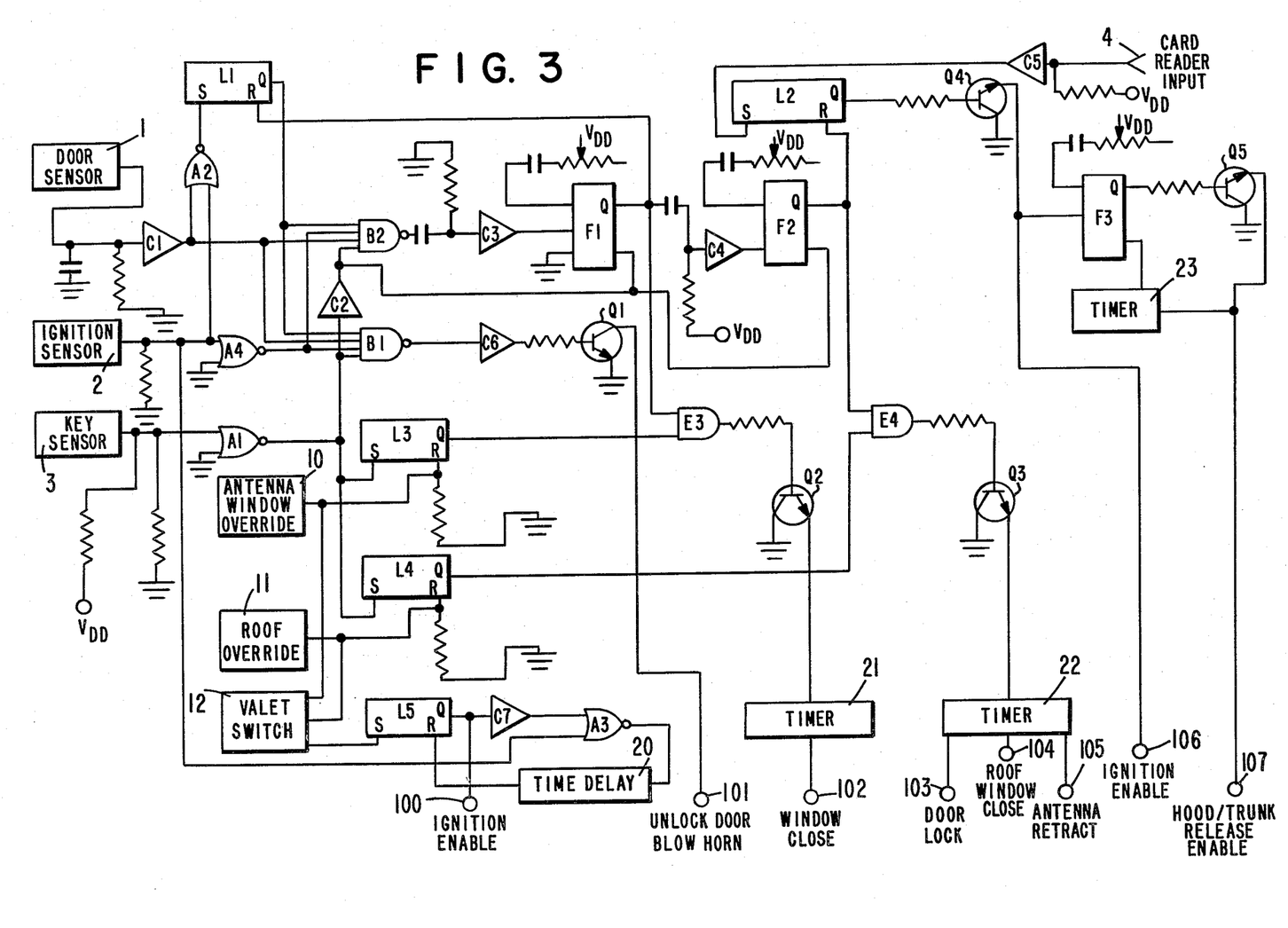
FIG. 3 shows a detailed logic circuit of one embodiment of the invention.

Referring now to FIG. 3, a low level logic circuit showing one embodiment of the invention is shown wherein door sensor 1, ignition sensor 2, and key sensor 3 provide inputs to the system. Each sensor is electrically connected to the respective accessory control of the motor vehicle (not shown) which may indicate their condition. For example, door sensor 1 detects the electrical status of the door jamb switch of the vehicle. Ignition sensor 2 may detect the electrical status of the ignition system of the internal combustion engine, or it may detect "engine running" status at the voltage regulator, manifold pressure at the air intake, exhaust pressure or temperature, or any number of other conditions which indicate that the engine is running. Key sensor 3 simply detects the presence of the key by monitoring the condition of the mechanical contact switch normally installed on the vehicle to operate the "key in" buzzer.

Condition setting means are also included in the preferred embodiment and are shown by antenna/window override switch 10, valet switch 12, and roof override switch 11 which provides the means to void the securing function of the system for each of the aforementioned accessories in any manner desired, including, but not limited to, that which is shown and described.

A conventional card reader (not shown) is another condition setting means of the system, the output of which is fed to input 4. The system outputs 100, 101, 102, 103, 104, 105, 106, and 107 control the accessories of the vehicle, which outputs are fed to relays or solenoids of the respective vehicle accessories. Output 107 is fed to the vehicle trunk and hood latch assembly, which is complimented with an electrically operated dead-bolt lock.

In operation, the vehicle ignition is enabled upon two conditions, that is firstly upon a high out from the card reader to input 4, which is inverted by INVERTER C5 to set LATCH L2, which in turn renders a high output at output Q to drive transistor Q4 high at output 106. The ignition may also be enabled by a high output Q of LATCH L5 when set by valet switch 12. L5 will automatically reset to a low condition after a predetermined time delay as determined by element 20 whenever LATCH L5 has been previously low or the ignition sensor 2 is high (engine on) so that LATCH L5 will turn off the ignition enable 100 whenever it has been once on or whenever the engine has been once on.

Now, as a lockout prevention means, the system will automatically reopen locked doors and blow the horn on the condition that NAND gate B1 has had four conditions met. Those conditions are: key sensor 3 is low (key in) providing a high output from NOR gate A1; engine (ignition) off (sensor 2 low) providing a high output from INVERTER C1, and door having been previously opened while the engine was off as determined by output Q of LATCH L. LATCH L1 is set high by NOR gate A2 by the door having been opened (low output from INVERTER C1) and the engine is off (low output from ignition sensor 2). Upon the existence of the four conditions at the inputs of NAND gate B1, the low signal therefrom is inverted by INVERTER C6 to drive transistor Q1 high at output 101 to unlock doors and blow the horn through the energization of relays or solid state switches (not shown).

With respect to the automatic securing functions of the circuit, initiation is accomplished by meeting the input conditions of NAND gate B2. Those conditions are: door having been opened as determined by a high output of LATCH L1 as previously explained; door in a closed condition as determined by a high output of INVERTER C1; engine off as determined by a high output of NOR gate A4; and the key removed from the ignition as determined by inverted low signal of NOR gate A1. The low output of NAND gate B2 is inverted by INVERTER C3 to a single-shot multivibrator F1, which when forced high, causes the window control at output 102 to be activated upon the condition that the override switch 10 has not been depressed. The logic is determined by AND gate E3 which drives transistor Q2 for activation of timer 21 for a timed operation of the window close function at output 102. The high output of multivibrator F1 also resets LATCH L1 for the next operation of the door.

Once multivibrator F1 is activated, its output also activates single-shot multivibrator F2 which secures the door locks, roof window, and antenna in a timed sequence by timer 22. Timer 22 is initiated by transistor Q3 which is set high on the condition that the output of multivibrator F2 is high and the roof override switch has not been depressed as determined by AND gate E4.

The completion of the securing functions as dictated by the output of multivibrator F2 also resets LATCH L2 to disable the ignition at output 106 and to disable the hood and trunk release at output 107 through multivibrator F3.

It can be clearly understood that the output of L2, being low shuts off transistors Q4 to drive output 106 to an off condition.

Respecting the hood and trunk release functions of the circuit, multivibrator F3, preferably a monostable type, output 107 is driven on for a predetermined time period as determined by automatic reset timer 23 when LATCH L2 is set high by the card reader input at input 4. Upon every high output of F3, timer 23 is started and provides a pulse to reset F3 after a certain time period.

Figure 14:
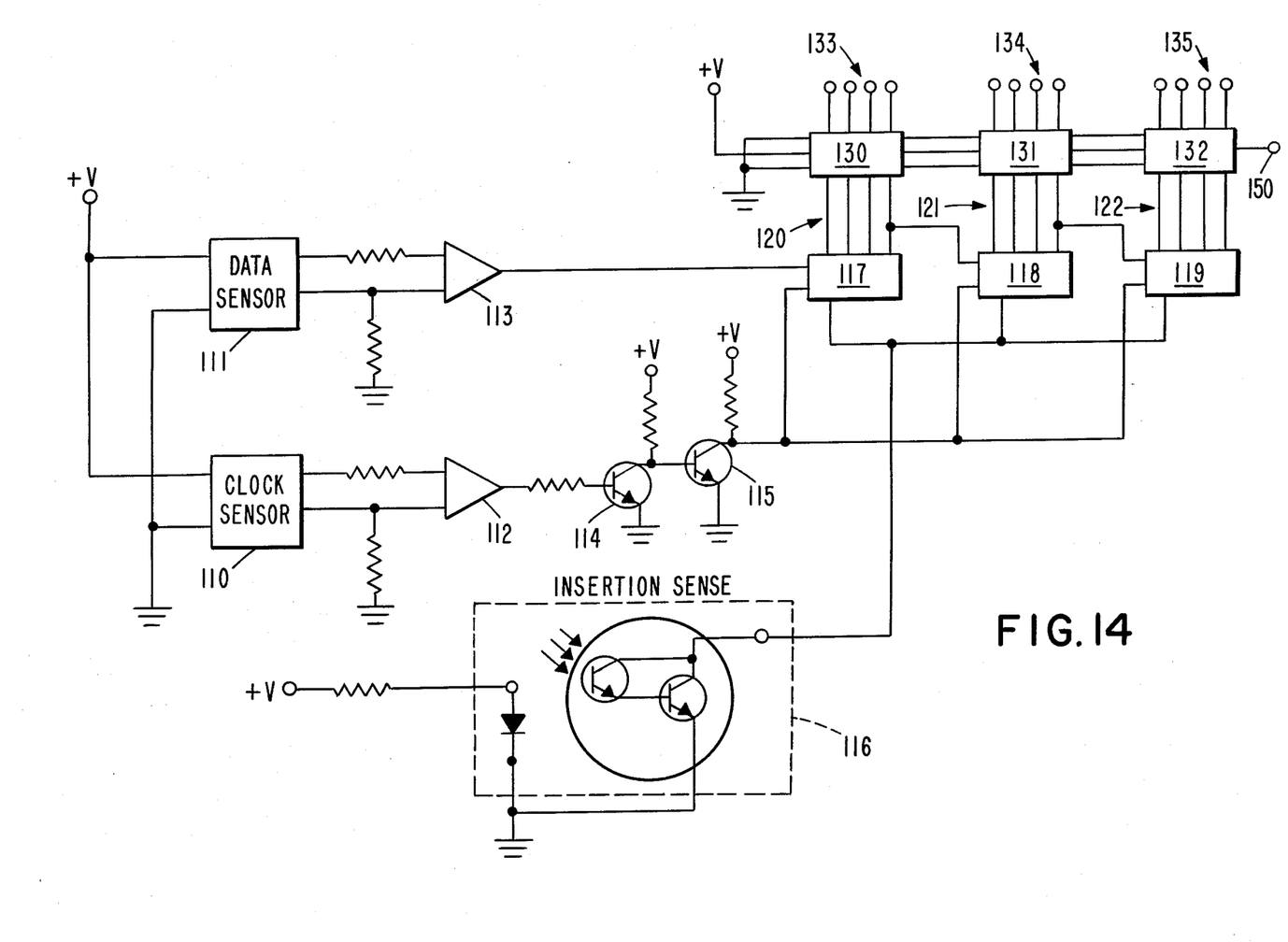
FIG. 14 depicts circuit arrangement for the encoder/decoder circuitry used in the card reader module of FIG. 4.

Now referring to FIG. 14, an electronic circuit of the card reader unit is disclosed. In connection with FIG. 3, element 4 of the unit is shown by FIG. 14 herein. The type of card reader employed is a dynamic card reader, but however, a static type card reader or any other type of detection and identification device may be utilized.

Specifically, FIG. 14 discloses 2 registers 110 and 111, designated as a clock sensor and a data sensor respectively. Each sensor is of the hall effect type which measures data bits or clock pulses as they are passed in close proximity to the sensors. The information detected by sensors 111 and 110 is respectively amplified by amplifiers 112 and 113 respectively. The clock pulse from sensor 110 passes through a darlington transistor arrangement which is in turn fed to registers 117, 118, and 119. The clock pulse provides the means for data to be registered within the register from sensor 111 and amplifier 113. Once the information is entered into registers 117, 118, and 119, an insertion sense 116 is activated to pulse the registers for data storage. Once the data is contained within the registers, a comparator compares bits therein and upon a true comparison, an enabling signal is transmitted at output 150 which corresponds to element 4 of FIG. 3. The arrangements of data bits which will trigger the output signal at 150 is determined by the data bit arrangement fixed on lines 120, 121, and 122. These data bits are fixed by the strapping arrangement of lines 133, 134, and 135 which may be fixed according to the desired data bit arrangement of the operator. For instance, certain of the lines within the group 133 through 135 may be tied to a ground or a positive charge, one representing a data bit "one", and the other representing the data bit "zero". According to the specific strapping arrangement tied into the data bit circuit arrangement, only magnetically encoded cards having the same or identical data bit stream recorded thereon will trigger the circuit to produce an enabling signal at output 150.

It is noted that the specific logic circuit shown is for illustrative purposes only and that several modifications and adaptations of the same can be made without departing from the scope and spirit of the invention. It is not the intent of the inventors to limit the scope of the invention to exactly that which is shown and described, but to include all such modifications and equivalencies which may be made by a person skilled in the art to which this matter pertains. The scope, again not limiting, is more precisely described in the appended claims.

Now, therefore, a brief description having been made, what is claimed is:

1. An electronic control system for use in a motor vehicle for enabling the operation of the vehicle and securing the accessories of said motor vehicle, said vehicle having a key switched and electrically operated ignition, at least one vehicle door having a door lock, and at least one vehicle accessory, which system comprises:
   (a) coding means having a predetermined code,
   (b) detection and identification means for detecting and identifying said coding means and producing an enabling signal upon detection and identification of said predetermined code,
   (c) enabling means responsive to said enabling signal for enabling the operation of the ignition system of the vehicle and for enabling the operation of the vehicle accessories, and
   (d) securing means for automatically securing the vehicle accessories and conditioning said enabling means to disable the operation of said ignition system and accessories, said securing means being activated when at least one vehicle door is opened and closed while the ignition key is removed from the ignition switch.

2. An electronic control system for use in a motor vehicle for enabling the operation of the vehicle, preventing lockout, and securing the accessories of the motor vehicle, said vehicle having a key switched and electrically operated ignition, at least one vehicle door having a door lock, and at least one vehicle accessory, which system comprises:
   (a) coding means having a predetermined code,
   (b) detection and identification means for detecting and identifying said coding means for producing an enabling signal upon detection and identification of said predetermined code;
   (c) enabling means responsive to said enabling signal for enabling the operation of the ignition system of the vehicle and for enabling the operation of the vehicle accessories,
   (d) securing means for automatically securing the vehicle accessories and conditioning said enabling means to disable the operation of said ignition system and accessories, said securing means being activated when at least one vehicle door is opened and closed while the ignition key is removed from the ignition switch, and
   (e) door unlocking means for unlocking at least one vehicle door, said unlocking means being activated when at least one of said vehicle doors is opened and closed while the key is positioned in the ignition switch.

3. An electronic control system for use in a motor vehicle for enabling the operation of the vehicle, preventing lockout, and securing the accessories of said motor vehicle, said vehicle having a key switched and electrically operated ignition system, at least one vehicle door having a door lock, and at least one vehicle accessory, which system comprises:
   (a) coding means having a predetermined code,
   (b) detection and identification means for detecting and identifying said coding means and producing an enabling signal upon detection and identification of said predetermined code,
   (c) enabling means responsive to said enabling signal for enabling the operation of the ignition system and accessories of the vehicle,
   (d) securing means having means to manually select certain of said accessories to remain normally operative and unsecured that automatically secures the unselected vehicle accessories and conditions said enabling means to disable said ignition system and the unselected accessories, said securing means being activated when at least one vehicle door is opened and closed while the ignition key is removed from the ignition, and
   (e) door unlocking means for unlocking at least one vehicle door, said unlocking means being activated when said vehicle door is opened and closed while the key is positioned in the ignition switch.

4. The invention of claim 1, 2, or 3 wherein the detection and identification means comprises a magnetically encoded card reader and said coding means comprises magentically encoded cards.

5. The invention of claim 4 wherein the vehicle accessories further include a power operated trunk latch release mechanism.

6. The invention of claim 5 wherein the vehicle accessories further include a power operated antenna.

7. The invention of claim 5 wherein said trunk release mechanism further includes inhibiting means for inhibiting the operation of the trunk release mechanism in response to the opening and closing of at least one vehicle door while the key is removed from the ignition switch.

8. The invention of claim 4 wherein the vehicle accessories further include a power operated hood latch release mechanism.

9. The invention of claim 8 wherein said hood latch release mechanism further includes inhibiting means for inhibiting the operation of the hood release mechanism in response to the opening and closing of at least one vehicle door while the key is removed from the ignition switch.

10. The invention of claims 1, 2 or 3 wherein said enabling means for enabling the ignition system and vehicle accessories includes an electrically operable solenoid responsive to said enabling signal for supplying current to the ignition and respective vehicle accessories from a source of power.

11. The invention of claims 1, 2, or 3 wherein the vehicle accessories include a power operated door lock and power operated door windows.

12. The invention of claim 11 wherein the vehicle accessories further include a power operated roof window.

13. The invention of claim 2 wherein said door unlocking means further includes a horn which is activated in response to the opening and closing of at least one vehicle door while the key is positioned in the ignition switch.

14. An electronic circuit for enabling the operation, automatically securing, and preventing lockout of a vehicle having an electrically operated ignition, at least one door having a door lock, and at least one accessory, which circuit comprises:
(a) means for sensing the presence of an ignition key in the ignition switch,
(b) means for sensing the ignition status of the ignition system of the vehicle,
(c) means for sensing the open-close status of the vehicle door,
(d) means for detecting and identifying a predetermined code means,
(e) means for enabling the ignition and accessories of said vehicle, said means being responsive to said means for detecting and identifying a predetermined code means to enable said ignition upon detecting and identifying a predetermined code,
(f) first gating means responsive to said door sensing means, said ignition sensing means, and said key sensing means for unlocking said vehicle door lock when said vehicle door is closed, ignition is off, and the key is present in the ignition, and
(g) second gating means responsive to said door sensing means, said ignition sensing means, and the key sensing means for securing the vehicle accessories and disabling the operation of said ignition and accessories when said vehicle door is closed, ignition is off, and the key is removed from the ignition.

15. The invention of claim 14 wherein said means for detecting and identifying a code means comprises a dynamic card reader for dynamically reading magnetically encoded cards, and said code means comprises magnetically encoded cards.

16. The invention of claim 14 or 15 wherein said ignition sensing means, key sensing means, and door sensing means consists of electrical switches operatively connected with said door, key and ignition of said vehicle.

17. The invention of claim 14 or 15 wherein said vehicle accessories include power operated door windows, power operated door locks.

18. The invention of claim 17 further including a power operated roof window, and a power operated antenna.

19. The invention of claim 17 wherein the vehicle accessories further include a power operated trunk release mechanism and a power operated hood release mechanism.

20. The invention of claim 14 or 15 wherein the vehicle accessories include a power operated antenna, power operated windows, and a power operated trunk release.

21. The invention of claim 14 wherein said second gating means includes means to selectively disable the accessory securing operation for certain of the vehicle accessories.

* * * * *